United States Patent
Fan et al.

(10) Patent No.: US 8,417,972 B2
(45) Date of Patent: Apr. 9, 2013

(54) POWER SUPPLY CONTROL CIRCUIT TO SAVE ELECTRICAL POWER OF AN ELECTRONIC DEVICE IN STAND-BY OR POWERED OFF MODES

(75) Inventors: Yong-Hua Fan, Shenzhen (CN); Ching-Chung Lin, Miao-Li County (TW)

(73) Assignees: Innocom Technology (Shenzhen) Co., Ltd., Shenzhen (CN); Chimei Innolux Corporation, Miao-Li County (TW)

( * ) Notice: Subject to any disclaimer, the term of this patent is extended or adjusted under 35 U.S.C. 154(b) by 438 days.

(21) Appl. No.: 12/762,988

(22) Filed: Apr. 19, 2010

(65) Prior Publication Data
US 2011/0066866 A1    Mar. 17, 2011

(30) Foreign Application Priority Data
Sep. 17, 2009   (CN) .......................... 2009 1 0307139

(51) Int. Cl.
*G06F 1/00*     (2006.01)
*G06F 1/26*     (2006.01)
*G06F 1/32*     (2006.01)

(52) U.S. Cl. .......................... 713/300; 713/320; 713/323

(58) Field of Classification Search .................... 713/300
See application file for complete search history.

(56) References Cited

U.S. PATENT DOCUMENTS

| | | | |
|---|---|---|---|
| 6,460,143 B1 * | 10/2002 | Howard et al. | 713/323 |
| 7,036,031 B2 * | 4/2006 | Takeuchi | 713/323 |
| 7,149,906 B2 * | 12/2006 | Sakai | 713/300 |
| 7,325,733 B2 * | 2/2008 | Wurzburg et al. | 235/441 |
| 7,839,661 B2 * | 11/2010 | Zheng et al. | 363/20 |

* cited by examiner

*Primary Examiner* — Suresh Suryawanshi
(74) *Attorney, Agent, or Firm* — WPAT PC; Justin King

(57) ABSTRACT

A power supply control circuit used to control a power supply to supply a MCU includes a first transistor switch, a RC circuit, a power switch control circuit, and an input signal control circuit. When the power switch control circuit is grounded via the MCU, the RC circuit is discharged to ground and the first transistor switch is switched on, such that the power supply supplies power to the MCU. When the MCU outputs a control signal to the input signal control circuit, the RC circuit is discharged to ground and the first transistor switch is switched on, such that the power supply supplies power to the MCU. When the MCU stops outputting the control signal to the input signal control circuit, the RC circuit is charged and the first transistor switch is switched off, such that the power supply does not supply power to the MCU.

12 Claims, 3 Drawing Sheets

POWER SUPPLY CONTROL CIRCUIT TO SAVE ELECTRICAL POWER OF AN ELECTRONIC DEVICE IN STAND-BY OR POWERED OFF MODES

BACKGROUND

1. Technical Field

The disclosure generally relates to power supply control circuits, particularly to a power supply control circuit used to save electrical power of an electronic device in stand-by or powered off modes and an electronic device using the power supply control circuit.

2. Description of Related Art

Referring to FIG. 3, a conventional electronic device 1 such as a liquid crystal display (LCD) includes a central processing unit (CPU) 10, a plurality of power output units 12a~12f, and a power supply 14. The CPU 10 connects to the power supply 14, and supplies power to electrical members of the electronic device 1 such as panels, inverters, and audio devices, etc via the power output units 12a~12f. When the electronic device 1 is in stand-by or powered off modes, the CPU 10 is still in work mode, and consumes electrical energy.

Therefore, there is room for improvement within the art.

BRIEF DESCRIPTION OF THE DRAWINGS

Many aspects of the power supply control circuit and electronic device using the same can be better understood with reference to the following drawings. The components in the drawings are not necessarily drawn to scale, the emphasis instead being placed upon clearly illustrating the principles of the power supply control circuit and electronic device.

DETAILED DESCRIPTION

Figure 1:
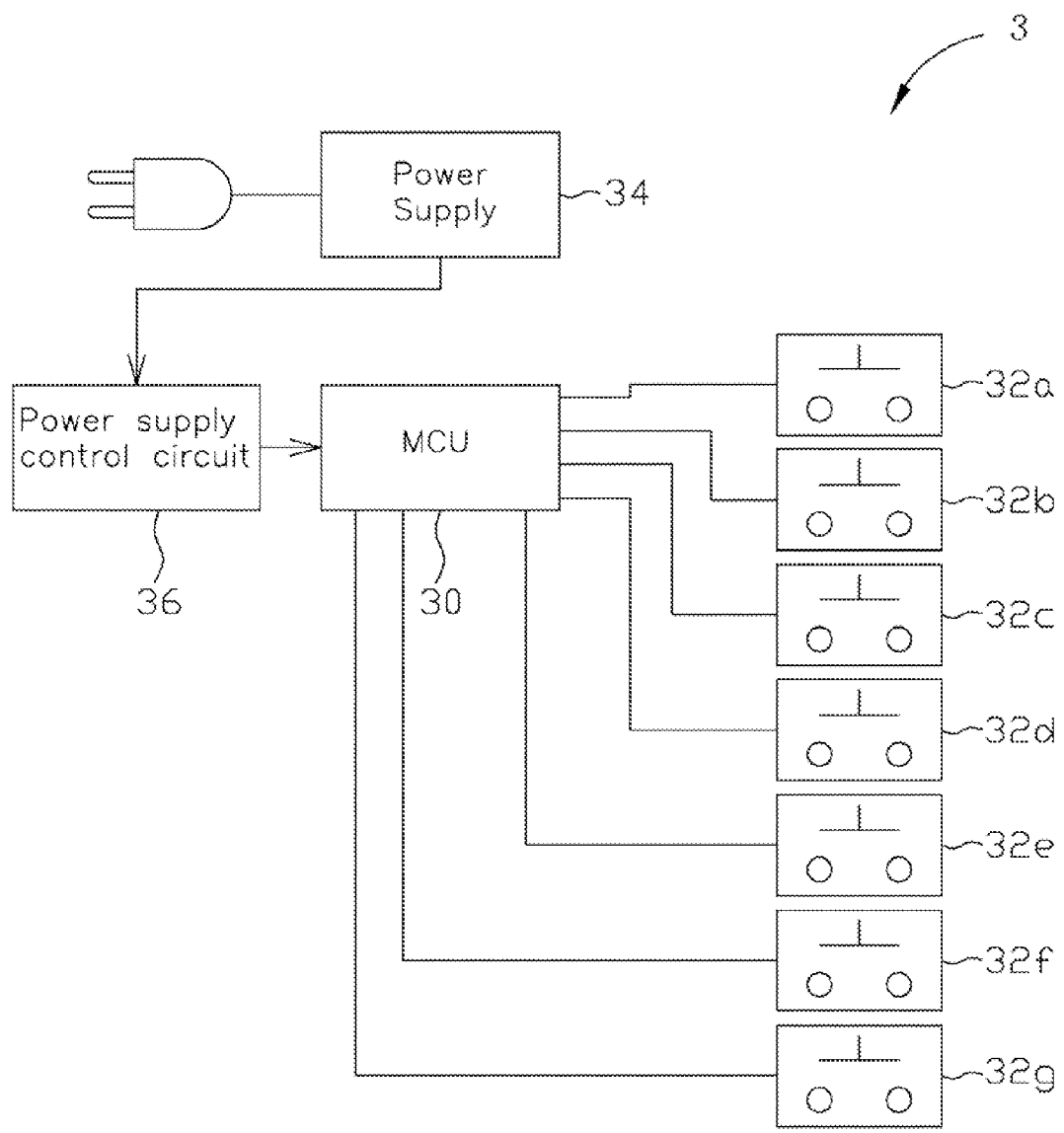
FIG. 1 is a schematic view of an electronic device employed with a power supply control circuit, according to an exemplary embodiment.

Referring to FIG. 1, an electronic device 3 of an exemplary embodiment such as a LCD, includes an micro controller unit (MCU) 30, a plurality of power output units 32a~32g, a power supply 34 and a power supply control circuit 36. The power supply control circuit 36 connects between the power supply 34 and the MCU 30, and controls the power supply 34 supplying power to the MCU 30. The MCU 30 supplies power to other electronic members of the electronic device 3 such as a panel, audio device, etc, via the power output units 32a~32g.

Figure 2:
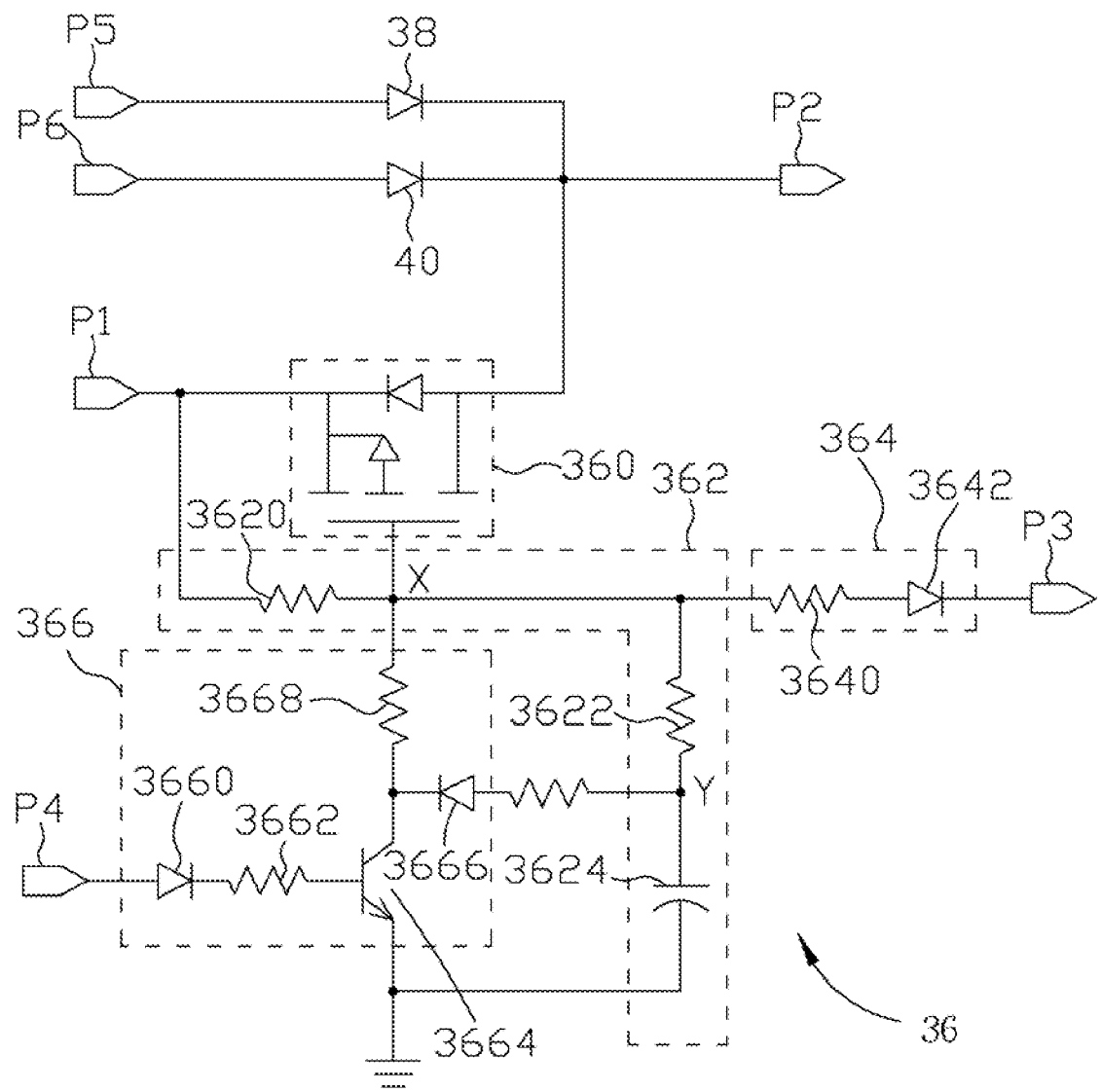
FIG. 2 is circuit diagram of the power supply control circuit of the electronic device shown in FIG. 1.
Figure 3:
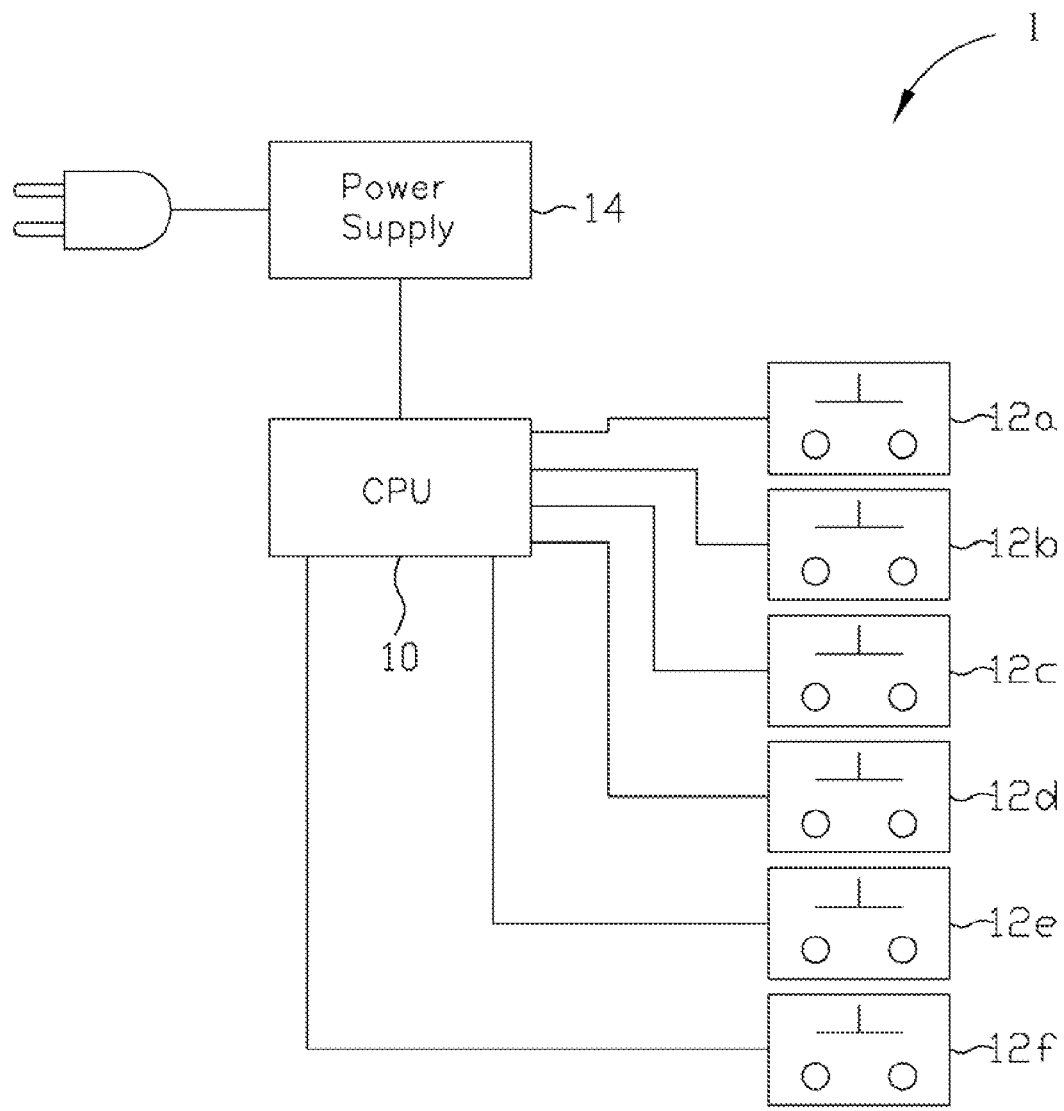
FIG. 3 is a schematic view of a conventional electronic device.

Referring to FIG. 2, the power supply control circuit 36 includes a first transistor switch 360, a resistor-capacitor (RC) circuit 362, a power switch control circuit 364, an input signal control circuit 366, a first terminal P1, a second terminal P2, a third terminal P3 and a forth terminal P4.

The first transistor switch 360 may be a N-channel metal oxide semiconductor (NMOS) or P-channel metal oxide semiconductor (PMOS) transistor. The first transistor switch 360 connects to the power supply 34 and the MCU 30, respectively via the first and second terminals P1 and P2.

The RC circuit 362 includes two resistors 3620, 3622 and a capacitor 3624. The two resistors 3620, 3622 and the capacitor 3624 are connected in series, and form a first node X between the resistors 3620, 3622 and a second node Y between the resistor 3622 and the capacitor 3624. An end of the resistor 3620 connects to the power supply 34 and the first transistor switch 360 via the first terminal P1. An end of the capacitor 3624 connects to ground. The first node X connects to the first transistor switch 360, the power switch control circuit 364 and the input signal control circuit 366. The second node Y connects to the input signal control circuit 366. The number of the resistors of the RC circuit 362 depends on the circuit design, and in other embodiments may not be limited to two.

The power switch circuit 364 includes a resistor 3640 and a diode 3642 connected in series. One end of the resistor 3640 connects to the first node X of the RC circuit 362. The cathode of the diode 3642 connects to a power switch (not shown) of the MCU 30 via the third terminal P3.

The input signal circuit 366 includes a first diode 3660, a first resistor 3662, a second transistor switch 3664, a second diode 3666, and a second resistor 3668. The anode of the first diode 3660 connects to the MCU 30 via the forth terminal P4. The cathode of the first diode 3660 connects to the base of the second transistor 3664 via the first resistor 3662. The collector of the second transistor 3664 connects to the first node X of the RC circuit 362 via the second resistor 3668. The emitter of the second transistor 3664 connects to ground. The cathode of the second diode 3666 connects to the collector of the second transistor 3664, and the anode of the second diode 3666 connects to the second node Y of the RC circuit 362 via a resistor (not labeled). The second transistor switch 3664 may be a negative-positive-negative (NPN) or positive-negative-positive (PNP) bipolar transistor.

When the power supply 34 connects to a power source (not shown), the capacitor 3624 charges via the resistors 3620, 3622, and also, the first transistor switch 360 is switched on, and the power supply 34 supplies power to the MCU 30. The MCU 30 executes preset programs such as an initialization or a reset program. After a delaying time that the capacitor 3624 is fully charged, the first transistor switch 360 switches off, and the power supply 34 stops supplying power to the MCU 30. The delaying time can be adjusted by changing the capacitance of the capacitor 3624.

When the electronic device 3 is in operating mode, the MCU 30 receives input signals from other electronic member (not shown) of the electronic device 3 such as display card or adapter, etc, and correspondingly sends control signals to the input signal control circuit 366 via the third terminal P4. The second transistor switch 3664 switches on, and the RC circuit 362 discharges to ground. The control signals controls the first transistor switch 360 switched on via the first diode 3660, the first resistor 3662, the second transistor switch 3664, the second diode 3666 and the second resistor 3668, and the power supply 34 supplies power to the MCU 30.

On the other hand, when the electronic device 3 is in stand-by or powered off mode. The MCU 30 stops sending control signals to the input signal control circuit 366. The second transistor switch 3664 switches off, and the RC circuit 362 charges via the resistors 3620, 3622. The first transistor switch 360 switches off when the capacitor 3624 is fully charged, and the power supply 34 stops supplying power to the MCU 30. The MCU 30 can obtain electrical power via input terminals P5, P6 of the other electrical members such as display cards or adapters via diodes 38, 40.

When a user presses a switch (not shown) for powering on/off the electronic device 3, the diode 3642 of the power switch control circuit 364 connects to ground via the MCU 30. The capacitor 3624 of the RC circuit 262 discharges to ground via the resistors 3622, 3640 and diode 364, and the first transistor switch 360 switches on. The power supply 34 supplies power to the MCU 30, and the MCU 30 executes preset programs. The capacitor 3624 recharges via the resistors 3620, 3622 after a delaying time. If the electronic device 3 powers on, the MCU 30 executes the initial program and sends control signals to the input signal control circuit 366 to keep the first transistor switch 360 switched on. If the electronic device 3 powers off, the MCU 30 executes the shutdown program.

When the electronic device 3 is in operating mode, the power supply control circuit 36 controls the power supply 34 to supply power to the MCU 30. When the electronic device 3 is in stand-by or powered off mode, the power supply control circuit 36 controls the power supply 34 to stop supplying power to the MCU 30, and the MCU 30 is supplied by the other electrical members. Therefore, electrical energy consumption of the electronic device 3 is reduced.

It is believed that the exemplary embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A power supply control circuit used to control a power supply to supply power to a Micro Control Unit (MCU), comprising:
   a first transistor switch;
   a Resistor-Capacitor Circuit (RC circuit);
   a power switch control circuit; and
   an input signal control circuit; wherein when the power switch control circuit is grounded via the MCU, the RC circuit is discharged to ground and when the first transistor switch is switched on, such that the power supply supplies power to the MCU;
   when the MCU outputs a control signal to the input signal control circuit, the RC circuit is discharged to ground and the first transistor switch is switched on, such that the power supply supplies power to the MCU; and
   when the MCU stops outputting the control signal to the input signal control circuit, the RC circuit is charged and the first transistor switch is switched off, such that the power supply does not supply power to the MCU;
   wherein the input signal control circuit includes a first diode, a first resistor, a second transistor switch, a second diode, a second resistor; the anode of the first diode is connected to the MCU, the cathode of the first diode is connected to the base of the second transistor via the first resistor, the collector of the second transistor is connected to the RC circuit via the second resistor; the emitter of the second transistor is connected to ground; the cathode of the second diode is connected to the collector of the second transistor and the anode of the second diode is connected to the RC circuit; when the MCU sends control signal to the input signal control circuit, the second transistor switch is switched on; when the MCU stop sending control signal to the input final control circuit, the second transistor switch is switched off.

2. The power supply control circuit as claimed in claim 1, wherein the RC circuit includes at least a resistor connected to the power supply and the first transistor switch, and a capacitor connected to the resistor.

3. The power supply control circuit as claimed in claim 2, wherein the power switch control circuit includes a resistor connected to the RC circuit, and a diode, the anode of the diode is connected to the resistor, and the cathode of the diode is connected to the MCU.

4. The power supply control circuit as claimed in claim 1, wherein the first transistor switch is a NMOS or PMOS transistor.

5. The power supply control circuit as claimed in claim 1, wherein the second transistor switch is a NPN or PNP bipolar transistor.

6. An electronic device, comprising:
   a Micro Control Unit (MCU);
   a power supply; and
   a power supply control circuit controlling the power supply to supply electrical power via the MCU; wherein the power supply control circuit comprising:
   a first transistor switch;
   a Resistor-Capacitor Circuit (RC circuit);
   a power switch control circuit; and
   an input signal control circuit; wherein when the power switch control circuit is grounded via the MCU, the RC circuit is discharged to ground and the first transistor switch is switched on, such that the power supply supplies power to the MCU;
   when the MCU outputs a control signal to the input signal control circuit, the RC circuit is discharged to ground and the first transistor switch is switched on, such that the power supply supplies power to the MCU; and
   when the MCU stops outputting the control signal to the input signal control circuit, the RC circuit is charged and the first transistor switch is switched off, such that the power supply does not supply power to the MCU;
   wherein the input signal control circuit includes a first diode, a first resistor, a second transistor switch, a second diode, a second resistor; the anode of the first diode is connected to the MCU, the cathode of the first diode is connected to the base of the second transistor via the first resistor, the collector of the second transistor is connected to the RC circuit via the second resistor; the emitter of the second transistor is connected to ground; the cathode of the second diode is connected to the collector of the second transistor and the anode of the second diode is connected to the RC circuit; when the MCU sends a control signal to the input signal control circuit the second transistor switch is switched on; when the MCU stop sending a control signal to the input signal control circuit, the second transistor switch is switched off.

7. The electronic device as claimed in claim 6, wherein the RC circuit includes at least a resistor connected to the power supply and the first transistor switch, and a capacitor connected to the resistor.

8. The electronic device as claimed in claim 6, wherein the power switch control circuit includes a resistor connected to the RC circuit, and a diode, the anode of the diode is connected to the resistor, the cathode of the diode is connected to the MCU.

9. The electronic device as claimed in claim 6, wherein the first transistor switch is a NMOS or PMOS transistor.

10. The electronic device as claimed in claim 6, wherein the second transistor switch is a NPN or PNP bipolar transistor.

11. The electronic device as claimed in claim 6, wherein the electronic device further includes other electrical members connected to the MCU, the MCU receives input signals from the electrical members and correspondingly sends control signals to the input signal control circuit.

12. The electronic device as claimed in claim 11, wherein when the first transistor switch is switched off, the other electrical members supplies power to the MCU.

* * * * *